United States Patent [19]
Shor

[11] Patent Number: 5,997,719
[45] Date of Patent: Dec. 7, 1999

[54] ELECTROCHEMICAL PROCESS FOR REFINING PLATINUM GROUP METALS WITH AMMONIUM CHLORIDE ELECTROCYTE

[75] Inventor: Peter S. Shor, Mt. Vernon, N.Y.

[73] Assignee: Shor International Corporation, Mt. Vernon, N.Y.

[21] Appl. No.: 09/061,971

[22] Filed: Apr. 17, 1998

[51] Int. Cl.[6] ....................................................... C25C 1/20
[52] U.S. Cl. ......................... 205/565; 205/566; 205/567; 205/704; 205/718; 205/791
[58] Field of Search ..................... 205/565, 566, 205/567, 704, 718, 771

[56] References Cited

U.S. PATENT DOCUMENTS

| | | | |
|---|---|---|---|
| 4,612,093 | 9/1986 | Shor | 204/111 |
| 4,895,626 | 1/1990 | Shor | 204/111 |
| 5,009,755 | 4/1991 | Shor | 204/111 |
| 5,269,912 | 12/1993 | Shor | 210/109 |

FOREIGN PATENT DOCUMENTS

| | | | |
|---|---|---|---|
| 52039523 | 3/1977 | Japan | B01J 3/96 |
| 06057347 | 3/1994 | Japan | C22B 1/00 |
| 1170676 | 1/1992 | Russian Federation | B01J 3/44 |

*Primary Examiner*—Donald R. Valentine
*Assistant Examiner*—JOnathan Brown
*Attorney, Agent, or Firm*—Schweitzer Cornman Gross & Bondell LLP

[57] ABSTRACT

A process for purifying and refining platinum group metals such as platinum, iridium, palladium, rhodium and the like by an electrochemical process using ammonium chloride as the electrolyte to form ammonium chloride platinum group salts as a "slime" followed by the use of ammonia hydroxide to dissolve and separate said salts from other materials in the slime. A further step to precipitate the platinum metals from the ammonia hydroxide may be employed.

10 Claims, No Drawings

ELECTROCHEMICAL PROCESS FOR REFINING PLATINUM GROUP METALS WITH AMMONIUM CHLORIDE ELECTROCYTE

BACKGROUND OF THE INVENTION

The present invention deals with a method of refining platinum group metals by an electrochemical process.

The conventional method of refining platinum and platinum group metals from such compositions is to dissolve the metal in boiling nitric acid and hydrochloric acid (aqua regia) until it dissolves. A hydrazine compound (such as hydrazine hydrochloride, hydrazine acetate, hydrazine hydrate, hydrazine, hydrazine sulfate, etc.) is then used to precipitate the pure platinum compounds out of solution. This standard method is extremely hazardous, requires exceptional safety precautions and creates toxic waste.

Electrolytic processes for the refining of gold are known in the art. In my U.S. Pat. Nos. 4,612,093 and 4,895,626 I describe my discovery of a refining process (and improvements on that process) based on a novel "pregnant" electrolyte, comprising a halide solution impregnated with a nascent oxygen source. This process is practiced in an electrolytic cell, wherein the gold to be recovered is the anode. The cell cathode is an inert electroconductive substance isolated from the major portion of the electrolyte by a semipermeable membrane. This membrane is permeable to sodium ions but not to the electrolysis-dissolved gold contained in the electrolyte. Thus, the gold does not deposit on the cathode but remains in solution. Portions of the electrolyte with the gold solution are removed from the cell and the gold is selectively precipitated by chemical reduction.

In my U.S. Pat. No. 5,009,755 I describe a further improvement on the previous patent by use of an electrolyte of ammonium chloride. The ammonium chloride as an electrolyte has the benefits Of maintaining a pH neutral solution through a buffering effect and also dissolving a portion of the normally insoluble silver chloride that typically forms when jeweler's scrap gold is being refined.

In contrast in the present process ammonium ions react with platinum group metals to form an ammonium chloride platinum group salt from which the platinum group metal is ultimately recovered by the use of ammonium hydroxide.

BRIEF DESCRIPTION OF THE INVENTION

The present invention is directed to a method for refining "platinum group metals". The latter term includes platinum, palladium, iridium, rhodium, ruthenium, and osmium. Such platinum group metals are normally recovered from alloys as used in various industrial applications, such as jewelry manufacture.

Platinum group-containing metals may be melted to form an ingot, typically with another metal such as copper, or may already be in such form in its industrial application. Higher platinum and group-percentage changes are preferably combined with copper to reduce the platinum group percentage to about 25 weight percent, although higher and lower percentages can be used. The ingot of metal is placed in a conventional electrolytic apparatus and serves as the anode therein. Preferably an anode bag surrounds the ingot to help separate the electrolytic slime produced at the ingot by the present process from other solids.

Ammonium chloride, normally as a saturated water solution, is used as the electrolyte. It serves to convert the platinum group metals into ammonium chloride platinum group salts "slime" during the electrolytic process. The process is conducted by the use of direct current and standard electrolytic refining conditions. Typically a voltage of 10 to 15 volts and amperage of 15 to 25 amps may be employed.

Base metals will dissolve in the ammonium chloride solution, while the platinum group metal, fall from the ingot as an ammonium chloride platinum group salt "slime"—a metallic mud containing the platinum group metals desired.

The slime "phase" is then reacted with ammonium hydroxide to dissolve the platinum group ammonium chloride salts.

If it is desired to recover the platinum salt back into a solid pure form, a known selective precipitant, such as hydrazine, may be added to turn the dissolved platinum salts into a solid pure form. Hydrazine sulfate is the preferred form of hydrazine.

By use of the present process, the platinum group metal content can be enriched from less than 1 wt % to over 99 wt %. Final purity is not effected by the original impurity.

DETAILED DESCRIPTION OF THE INVENTION

The ammonium chloride electrolyte used in the practice of the present invention is present in sufficient concentration under the electrolyte conditions used to convert the platinum group metal into an ammonium chloride platinum group salt slime. The ammonium chloride electrolyte can preferably be maintained at a wide range of pH conditions and temperatures. Ambient temperature conditions and 6–8 pH are typical. Higher temperatures will produce faster results.

Typically the ammonium chloride electrolyte would be at saturation; However, lower concentrations can also be used.

The process of the present invention can be performed in standard electrolytic cells such as used in the laboratory or for commercial refining. Examples include a thumb cell, moebius cell, or cells of the general type set forth in my prior patents.

A direct current is applied. Power can be varied over an extremely wide range. Voltages of 10 to 15 volts and amperages of 15 to 25 amps are preferred. At 12 volts and a current of 20 amps, the dissolution rate of he platinum metal will be approximately 1 ounce per hour. Higher amperages will result in faster dissolution of the base metals in the ammonium chloride solution whereas the platinum group metals are separated out as a platinum group chloride salt taking the form of a slime or metallic mud.

The platinum group-containing metal forms the anode of the electrolytic cell. It is preferable to encase the anode in a permeable anode bag to help collect materials within the anode bag.

Such permeable anode bags are well known in the art. They typically are made of standard nylons or corrosion resistant woven fabrics, e.g., polyesters, cotton, etc. The anodes should permit circulation of the electrolyte but be of sufficient fine mesh to enclose the ammonium chloride platinum group salt slime formed in accordance with the present invention. The resultant slime is then contacted with an ammonium hydroxide solution.

When employing an anode bag, after completion of the electrolytic step it is removed from the electrolytic cell. The anode bag may be rinsed out to recover the slime, or alternatively and preferably, put directly into an ammonium hydroxide solution where the platinum group ammonium chloride salts dissolve.

The ammonium hydroxide is preferably at a saturation concentration at ambient temperature, although lesser concentrations and other temperatures can be employed.

The platinum salts thus dissolved in the ammonium hydroxide are then recovered by adding known selective precipitants to the latter, such as hydrazine. The precipitation step is similarly normally conducted at room temperature, although other temperatures may be employed in accordance with the precipitant used.

While an anode bag has been described for keeping the electrolytic slime produced at the anode-ingot separate from any other solids, any method which accomplishes this objective is acceptable.

While particular embodiments of the present invention have been described, variations of details may be made without departing from the invention as defined in the appended claims.

I claim:

1. A method for electrofining a platinum group metal which comprises:
   (i) forming an electrolytic cell comprising an anode of a platinum group metal, a cathode and an electrolyte of ammonium chloride,
   (ii) imposing a sufficient voltage between said anode and said cathode to form ammonium chloride platinum group salts as a slime,
   (iii) separating said ammonium chloride platinum group salt slime from components soluble in said electrolyte, and
   (iv) admixing it with a fluid agent to separate platinum group salts from other metals in said slime to thereby recover platinum group metal of increased purity.

2. The method of claim 1, wherein said agent is ammonium hydroxide.

3. The method of claim 1, wherein a voltage of 10 to 15 volts and an amperage of 15 to 25 amps is applied.

4. The method of claim 3, wherein the precipitant is hydrazine.

5. The method of claim 1, wherein a selective precipitant is added to the fluid agent solution to precipitate platinum group salts dissolved therein.

6. The method of claim 1, wherein step (ii) is conducted at a pH of 6 to 8 and at ambient temperature.

7. The method of claim 1, wherein a saturated solution of ammonium chloride electrolyte is employed.

8. The method of claim 7, wherein the anode bag is directly immersed in ammonium hydroxide to dissolve the platinum group ammonium chloride salts.

9. The method of claim 1 which further comprises encasing said anode in a permeable anode bag so as to enclose the platinum group ammonium chloride salt slime and to permit its ready recovery for admixture with ammonium hydroxide.

10. The method of claim 1, wherein the step of forming an electrolyte cell includes the step of forming an anode having about 25 percent platinum-group metals.

* * * * *